(No Model.)

A. F. WYMAN.
PNEUMATIC TIRE.

No. 481,323. Patented Aug. 23, 1892.

Witnesses
Fred A. Mason
C. O. Mason

Inventor
Adolphus F. Wyman
by H. W. Mason
atty.

UNITED STATES PATENT OFFICE.

ADOLPHUS F. WYMAN, OF NEW BEDFORD, MASSACHUSETTS.

PNEUMATIC TIRE.

SPECIFICATION forming part of Letters Patent No. 481,323, dated August 23, 1892.

Application filed June 3, 1892. Serial No. 435,378. (No model.)

*To all whom it may concern:*

Be it known that I, ADOLPHUS F. WYMAN, a citizen of the United States, residing at New Bedford, in the county of Bristol and State of Massachusetts, have invented certain new and useful Improvements in Pneumatic Tires, of which the following is a specification.

The object of my invention is to provide means whereby when the tire is punctured the puncture will be immediately and automatically sealed.

To this end my invention consists in providing the interior of the tire with a piece of sheet-rubber which shall constantly be in position to act as a seal when the tire is punctured.

The accompanying drawings illustrate my invention, in which—

Figure 1:
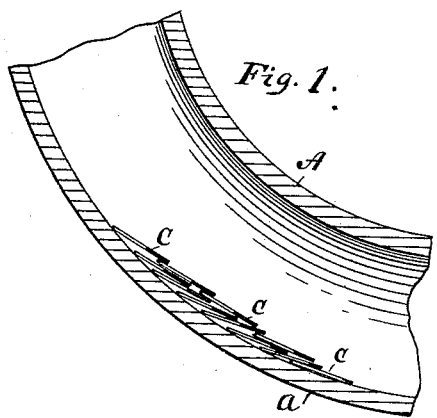
Figure 2:

Figure 1 represents a portion of a pneumatic tire in longitudinal section provided with my invention. Fig. 2 represents a view of one of the pieces of thin sheet-rubber with which the interior of the tire is supplied.

Similar letters refer to similar parts in the several views.

A represents the body of the tire, and $a$ represents the tread thereof. The interior of the tire I supply with a number of pieces of thin sheet-rubber $c\ c$, which are of a size to admit of their free movement within said tire. As the wheel revolves the pieces $c\ c$ are constantly sliding down to cover that point of the tire which has just touched the ground, and if the tire is punctured it will be at that point which rests on the ground, and consequently the point over which the piece of rubber $c\ c$ will immediately slide, and one of said pieces will find its seat over the spot of the puncture and automatically seal it.

Having thus described my invention, what I claim, and desire to secure by Letters Patent, is—

A pneumatic tire having its interior provided with a number of thin pieces of rubber adapted to have free movement within said interior as the wheel revolves, as and for the purpose shown and described.

ADOLPHUS F. WYMAN.

Witnesses:
HENRY W. MASON,
JAMES C. HITCH.